Figure 1:
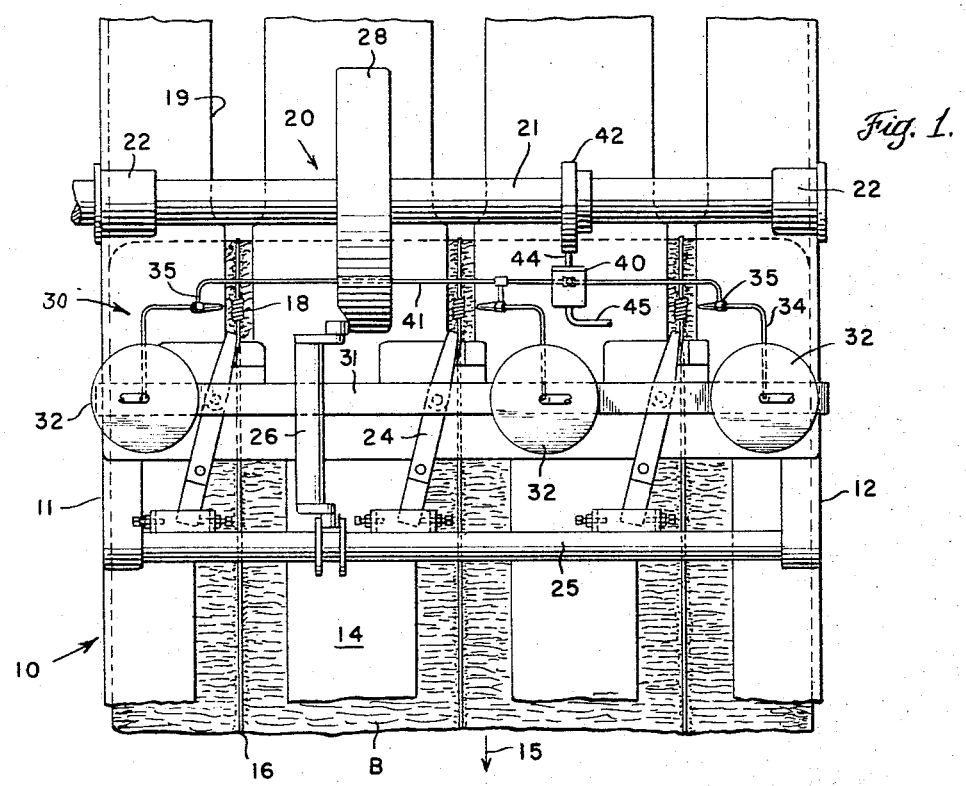

Aug. 1, 1967    J. H. SHEPLEY    3,333,532
BALER ATTACHMENT
Filed Aug. 25, 1965

INVENTOR.
JOHN H. SHEPLEY
BY
*Joseph A. Brown*
ATTORNEY

United States Patent Office 3,333,532
Patented Aug. 1, 1967

3,333,532
BALER ATTACHMENT
John H. Shepley, Lancaster, Pa., assignor to Sperry Rand Corporation, New Holland, Pa., a corporation of Delaware
Filed Aug. 25, 1965, Ser. No. 482,427
7 Claims. (Cl. 100—29)

This invention relates generally to hay balers. More particularly, the invention relates to a bale marking system whereby the bales produced by one baler may be distinguished from bales made by another.

In most areas of the United States, balers produce hay bales which can be handled manually. For example, bale weights might be from forty to seventy-five pounds per bale. However, in certain commercial hay growing areas, very large bales are made and these may weigh several times the weight of a standard bale.

In those areas where large bales are produced, particularly in California and in the western part of the United States, ranchers who grow hay and custom operators who harvest it are both paid by the ton. Each truck load of hay is taken from the field to a weighing station and the purchaser of the hay pays the rancher according to the weight slip. The rancher in turn then pays the custom operator on the basis of this same slip.

One problem which occurs from time to time in certain areas is bale pilferage. Bales are removed from the trucks before they are officially weighed which results in a loss to the rancher, because he is not paid later for all of the hay he produced, and to the operator, because he is not paid for all of the hay he has harvested.

Individuals who take bales which do not belong to them are difficult to apprehend because stolen bales can not be identified. They all look substantially alike. Further, the rancher and operator are unable to prove that any bales were taken. For example, an operator may bale to produce one hundred and fifty pound bales. However, bale weights differ in field operations and when a truck load of bales has been provided, they may average one hundred and sixty pounds, for example. But the operator does not know this until the weighing slip is received. Therefore, if a few bales are taken from a truck, no one can be sure that this has been done. Guessing that the bales are about one hundred and forty pounds each, the operator can only estimate truck weight by counting the bales in the load and multiplying this by the estimated average bale weight. At about one hundred and fifty to seventy pounds per bale, it only takes about a dozen stoles bales to make a ton.

A main object of this invention is to provide a simple attachment for a hay baler whereby bales will be marked when they are completed in a baler so that when they are subsequently picked up and loaded on a truck, the bales produced by one rancher and operator may be distinguished from bales produced by others so that if some of the bales are removed from the truck before the load is weighed, they may be subsequently identified and reclaimed.

Another object of this invention is to provide a bale marking device for a baler which will not interfere with the ordinary operation of the baler and will not contaminate the bales which have been produced.

Another object of this invention is to provide a bale marking device for a hay baler operative so that many variations and combinations of markings can be employed so that the bales produced by one hay baler may be identified from those produced by another.

A further object of this invention is to provide a bale marking device which is actuated responsive to operation of the tying mechanism and in conjunction therewith.

A still further object of this invention is to achieve the foregoing objects with a structure which is relatively inexpensive and low in cost.

Other objects of this invention will be apparent hereinafter from the specification and from the recital in the appended claims.

Figure 2:
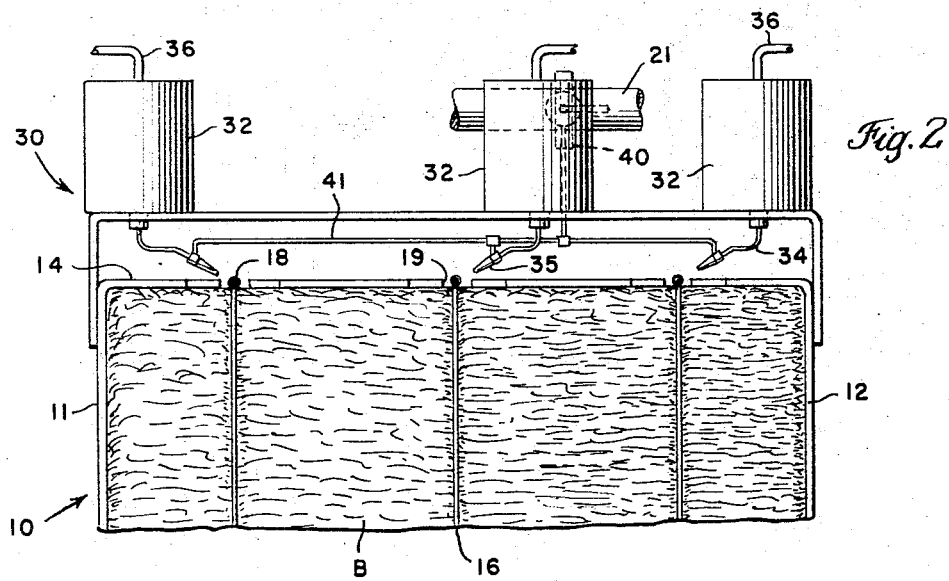

In the drawing:

FIG. 1 is a fragmentary plan view of a portion of a bale case of a hay baler and part of the tying mechanism therefor, there being associated therewith a bale marking device constructed according to this invention; and FIG. 2 is a fragmentary vertical section of the bale marking device shown in FIG. 1.

Referring now to the drawing by numerals of reference, 10 denotes generally a bale case having vertical side walls 11 and 12 and a top wall 14. Within bale case 10, bales B are formed and they progressively travel through the bale case in the direction indicated by the arrow 15 in FIG. 1. In the embodiment of the invention shown in the drawing, each bale is banded by a tying medium comprising three wires 16 which extend in a fore-and-aft direction relative to the bale case extension. The wire ends are connected by ties 18 to complete a banded bale. Free passage and projection of the wire is permitted by slots 19 in the bale case top wall. There are corresponding slots in the bottom wall of the bale case, not shown.

The tying of each completed bale is performed by a tying mechanism 20 (FIG. 1) constructed along the lines of the mechanism shown in U.S. Patent No. 2,953,082. Such mechanism twists the terminal free ends of a wire band to twist the ends together and form a tie or twist 18. The mechanism includes a timer shaft 21, supports 22, wire cut and clamp members 24, a transversely oscillatable control arm 25, and an arm actuating link 26 operated by timer shaft cam 28. These components of the tying mechanism are conventional and form no part per se of the present invention. Certain other components of the tying mechanism have been omitted from the drawing to more clearly illustrate the invention involved here.

Mounted on bale case 10 is a marking device 30 constructed according to this invention. It comprises a support frame 31 which straddles the bale case and carries three supply tanks 32. Each supply tank holds a colored liquid and each has a line or tube 34 which projects downwardly and carries a nozzle 35 at its lower end above and adjacent to one of the wire ties 18 made by the tying mechanism. Each tank 32 has a pressure inlet line 36. For intermittently actuating the discharge of liquid from the nozzles 35, an air valve 40 is provided having a feeder line 41 which connects to each nozzle 35. The timer shaft 21 of tying mechanism 20 has a cam 42 which engages a spring actuated plunger 44 on the air valve. A tube 45 connects to an air source.

Each tank 32 preferably contains liquid coloring which is edible. The coloring of the liquid in one tank is different from the coloring in the other tanks. For example, one tank might contain a yellow coloring, another red and another green. Then, when timer shaft 21 rotates at the completion of a bale, the cam 42 rotates with it, pushes the plunger 44 of air valve 40 and causes a spray of coloring to come from each of the nozzles 35. The spray is directed onto the tie 18 of each wire 16. When exposed to the atmosphere, the coloring dries and when the bale is discharged from the baler, it has identifying indicia as a result of the color combination applied to the twists. Thereafter, when the bales are picked up and trucked to a weighing station, if some of the bales are removed the baler operator and rancher can later determine and identify the bales.

A wide variety of color combinations may be employed so that every farmer can have his own distinctive marking arrangement. The marked hay bales can be identified much the same as branded cattle. With this invention, the source of baled hay may be determined and losses heretofore occasioned by ranchers and custom operators may be curtailed. In a short time, the savings in bales previously lost will more than pay for the marking device provided on the baler.

In the description, the spray is recited to be applied to the wire twists. It is believed that this is the most appropriate and convenient place to use it. However, since the food coloring is edible, it might be applied directly to the bale surface if desired. Also, twine or some other tying medium might be involved.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a hay baler having a bale case in which bales are formed and banded with a tying medium, a tier mechanism mounted on said bale case for producing ties, and a bale marking device operatively associated with said tier for applying indicia to the outside of each bale whereby the bales produced by said baler may be identified subsequent to discharge from the baler.

2. The combination recited in claim 1 wherein said indicia comprises liquid edible food coloring ejected onto each bale.

3. The combination recited in claim 1 wherein said tier has a timer shaft which rotates during a tying operation, and means actuated responsive to rotation of said timer shafts for operating said marking device.

4. The combination recited in claim 1 wherein said tying medium is wire and said tier mechanism produces wire ties, the markings on each bale being applied to said ties.

5. The combination recited in claim 1 wherein each bale is banded with a plural number of wires each of which has a tie, said applying means comprising a plural number of nozzles, each directed toward one of said ties to apply liquid coloring thereto.

6. The combination recited in claim 5 wherein said tier has a timer shaft, and there being valve means for ejecting liquid coloring through said nozzles, and means on said timer shaft for operating said valve means responsive to rotation of the shaft.

7. The combination recited in claim 6 wherein the operating means for said valve means comprises a cam on said timer shaft.

References Cited

UNITED STATES PATENTS

| 1,846,518 | 2/1932 | Hibline | 40—326 X |
| 2,642,793 | 1/1953 | Heisey | 99—235 |
| 3,090,350 | 5/1963 | Walters | 118—315 X |
| 3,232,215 | 2/1966 | Agle | 100—102 X |

BILLY J. WILHITE, *Primary Examiner.*